United States Patent [19]

Mukherjee

[11] Patent Number: 4,988,646

[45] Date of Patent: Jan. 29, 1991

[54] METHOD FOR PRODUCING A CERAMIC

[75] Inventor: Shyama P. Mukherjee, Vestal, N.Y.

[73] Assignee: International Business Machines, Armonk, N.Y.

[21] Appl. No.: 385,993

[22] Filed: Jul. 27, 1989

Related U.S. Application Data

[63] Continuation of Ser. No. 193,023, May 12, 1988, abandoned.

[51] Int. Cl.$^5$ .............................................. C04B 35/00
[52] U.S. Cl. ........................................ 501/98; 501/12
[58] Field of Search .............................. 501/12, 98, 96

[56] References Cited

U.S. PATENT DOCUMENTS

| | | | |
|---|---|---|---|
| 4,429,051 | 1/1984 | Davidge et al. | 501/94 |
| 4,517,037 | 5/1985 | Francis et al. | 501/96 |
| 4,547,471 | 10/1985 | Huseby et al. | 501/98 |
| 4,574,063 | 3/1986 | Scherer | 501/80 |
| 4,581,295 | 4/1986 | DeLiso et al. | 501/97 |
| 4,596,781 | 6/1986 | Carpenter | 501/98 |
| 4,690,790 | 9/1987 | Bates | 501/92 |
| 4,693,989 | 9/1987 | Sane | 501/93 |
| 4,719,187 | 1/1988 | Bardhan et al. | 501/96 |
| 4,766,097 | 8/1988 | Shinozaki et al. | 501/98 |

OTHER PUBLICATIONS

Hlavac, J., "The Technology of Glass and Ceramics", Elsevier Pub., N.Y., (1983), p. 297.

Primary Examiner—Olik Chaudhuri
Assistant Examiner—Andrew Griffis
Attorney, Agent, or Firm—Pollock, Vande Sande & Priddy

[57] ABSTRACT

A nitride, preferably AlN, ceramic is produced by contacting a mixed oxide gel (produced from organometallic/inorganic metal salt precursors) which, during sintering steps, transform into a melt that forms low contact angle with the nitride powder. The composition is sintered to thereby produce the desired ceramic.

17 Claims, 3 Drawing Sheets

METHOD FOR PRODUCING A CERAMIC

This application is a continuation of Ser. No. 193,023, filed on May 12, 1988, now abandoned.

DESCRIPTION

1. Technical Field

The present invention is concerned with a method for producing a ceramic and especially concerned with producing a ceramic from a nitride, preferably AlN.

The ceramics produced by the present invention are especially suitable as substrates electronic circuits.

The method of the present invention is concerned with an improved sintering that provides enhanced densification of the ceramic at lower temperatures.

2. Background Art

The development of more complex, integrated circuits and higher density of circuit elements with an accompanying increase in heat generation has necessitated development and use of new ceramic substrates. Such substrates must be capable of dissipating the heat generated and not interfere with the normal operation of the circuitry.

Among the more advanced ceramic materials presently suggested are those produced from carbides and/or nitrides including silicon carbide, silicon nitride, and aluminum nitride.

Discussions of various ceramics from nitrides can be found, for instance, in U.S. Pat. No. 4,547,471 to Huseby, et al., U.S. Pat. No. 4,591,537 to Aldinger, et al., U.S. Pat. No. 4,596,781 to Carpenter, and Werdecker, "Aluminum Nitride—An Alternative Ceramic Substrate for High-Power Applications in Microcircuits", *IEEE Transactions on Components, Hybrids, and Manufacturing Technology*, Vol. CHMT-7, No. 4, Dec. 1984, pages 399–404.

Although the ceramics from nitrides are among the more promising materials for substrates for electronic circuitry and exhibit excellent heat dissipation, the fabrication processes could stand improvement. This is particularly so with respect to the sintering rate and/or sintering temperature of such procedures that are not entirely satisfactory.

There is a special problem associated with the solid state sintering to full density of carbides and nitrides because of their covalent bonding which is responsible for the low diffusivity at a temperature below that at which thermal decomposition is dominant.

Moreover, the liquid phase sintering of the ceramics, particularly when employing pressureless sintering procedures, suffer from a problem of reduced density exhibited by the final ceramic. This problem associated with reduced density is believed caused by vaporization or volatilization as evidenced by large weight losses during the thermal decomposition of the nitride during sintering at high temperatures.

For instance, with respect to silicon nitride, see Baik, et al., "Effect of Silicon Activity on Liquid-Phase Sintering of Nitrogen Ceramics", *Communications of the American Ceramic Society*, C-124-126, May 1985, wherein silicon is suggested as an additive to the silicon nitride powder to thereby suppress the volatilization and help to achieve dense ceramic components.

Reduced or low density is undesirable since such leads to reduced thermal conductivity of the ceramic.

At high temperatures, the dissociation/decomposition of nitrides, particularly AlN, creates the formation of defective structures and diffusion of oxygen into the crystal lattice. The incorporation of oxygen in the crystal lattice of AlN reduces the thermal conductivity.

SUMMARY OF INVENTION

The present invention makes it possible to lower the sintering temperature and to enhance the sintering rate. The lowering of sintering temperature and enhancing the sintering rate are desirable for the fabrication of nitride ceramics having high thermal conductivity, particularly in view of the above-discussed problems associated with high temperature. Moreover, the lowering of sintering temperature will allow the cofiring of metal layer with the ceramics such as AlN to fabricate multilayer ceramic substrates.

The present invention is concerned with a method of producing a ceramic. The ceramic obtained by the present invention is a nitride containing material. The method of the present invention provides for improved densification of the ceramic along with the ability to employ lower sintering temperatures. In addition, the present invention provides for an enhanced sintering rate.

The method of the present invention includes obtaining a powder of a nitride and contacting the powder with a sol of organometallic compounds and/or inorganic metal salts which subsequently form a gel. The gel produced at the boundaries of the powders primarily as coatings eventually transforms into a melt or liquid phase during the sintering stage and forms a low contact angle with the powder and acts as a sintering aid.

BEST AND VARIOUS MODES FOR CARRYING OUT INVENTION

Figure 1:
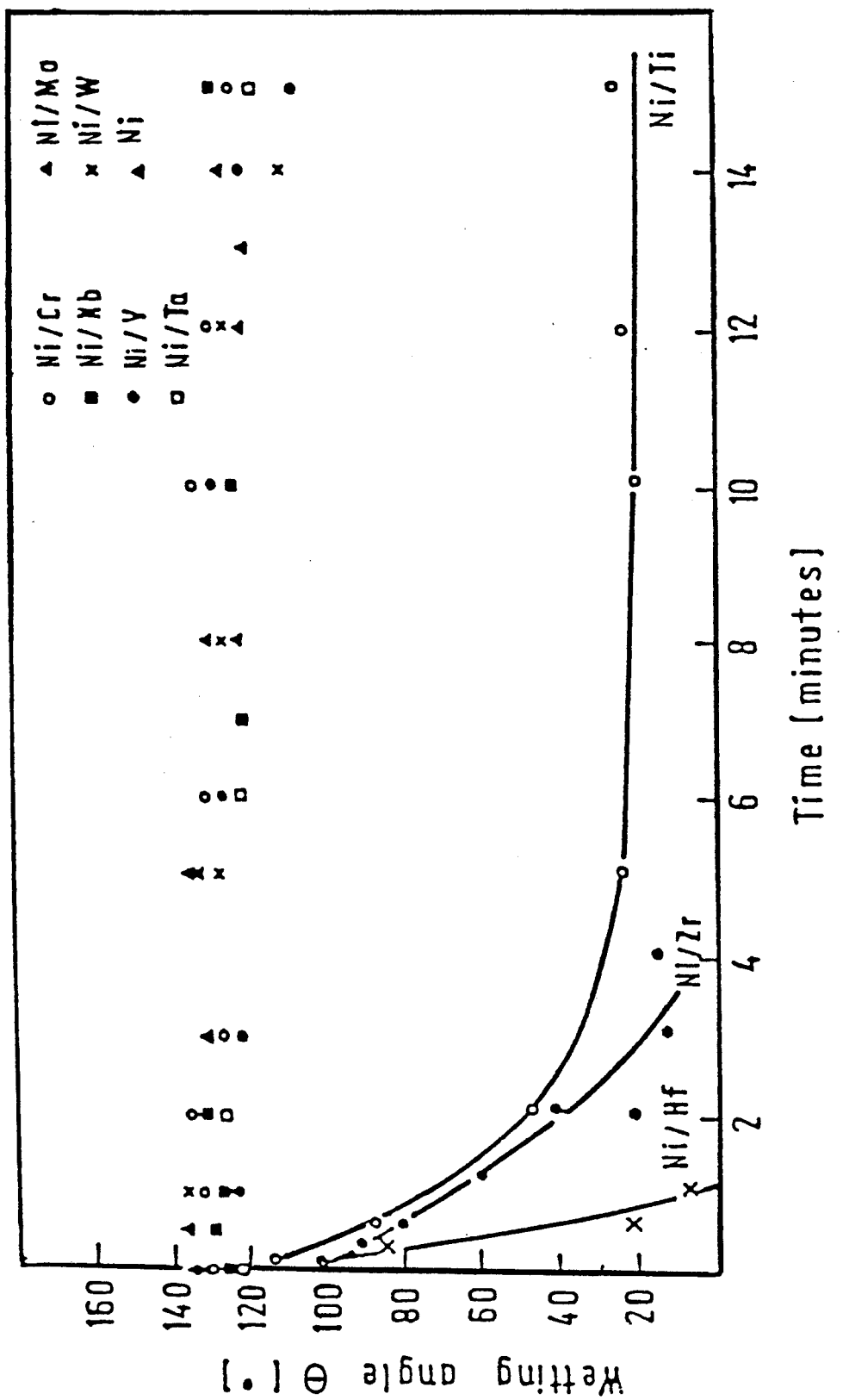
FIG. 1 is a graph plotting wetting angle versus contact time for various nickel alloys on AlN substrates (Reference: M. Trontelj and D. Kolar, J. Am. Ceram. Soc. 61 (5-6) 1978.

The present invention is concerned with producing ceramics from nitrides that exhibit increased density. The preferred ceramics produced by the present invention are those based upon aluminum nitride and silicon nitride with the most preferred being aluminum nitride.

In accordance with the present invention, a powder of the nitride is provided. The particle size of the powder is usually from about 1 $\mu$m (microns) to about 12 $\mu$m (microns) and preferably about 2 microns to about 5 microns with the most preferred average particle size of about 2 microns. Usually, the particle size distribution curve of the powders employed shows a median of about 2 $\mu$m.

The chemical composition of the powder is given below:

| Chemical Composition of AlN Powders (% by Weight) |
|---|
| Al = 65.32% |
| N = 34.6% |
| O = 1.59% |

| Chemical Composition of AlN Powders (% by Weight) |
| --- |
| C = 0.063% |
| Si = 0.0132% |

In accordance with the present invention, the powder is contacted with a sol of organo-metallic compounds and/or inorganic salts. The sol transforms into a gel. The gel composition is such that on subsequent heat treatment during the drying and sintering stages, the gel will decompose to create a reducing environment due to the presence of residual organics which assist in the reduction of oxide layer on the nitrides. At higher temperatures the gel will produce in situ a melt or liquid phase. It is essential that the gel-derived grain boundary melt form a low contact angle with the powder in the grain of the nitride. The melt thus acts as a sintering aid for nitride material which, in turn, results in increasing the sintering rate. Moreover, the composition and reactivity of the gel layer is effective in reacting with the nitrogen released during the sintering step to form nitrides and thus the pressure which is generated at the pores of the grain boundary is reduced, consequently, the sintering is enhanced. In the preferred aspects of the present invention, organo-metallic compounds and/or inorganic salts of transition metals and/or rare earth metals are employed. The rare earth elements and group IV transition elements which these stable nitrides and enhance the sintering rate.

In addition, it is critical to the success of the present invention that the metallic material be employed in the form of a sol-gel. The sol-gel process allows a uniform distribution of the sintering aids as highly reactive products chemically bonded to the powder surface. Thus, the distribution, composition, and reactivity of the grain boundary layers which play a major role in liquid phase sintering are controlled by the appropriate use of sol-gel processing.

The nitride powders can be contacted with the sol (in a non-aqueous solvent) by applying the sol as a gel coating to the powder. The technique used is based on the percolation of the sol through ceramic powders.

Alternatively, the powder can be contacted with the gel by first dispersing the powder in a non-aqueous medium that contains the sol of organo-metallic compounds that are capable of forming a gel and then converting the dispersion into a gel containing the sintering additives and the powder.

In accordance with the present invention, the nitride powders are usually at least about 90% by weight of the combined solids from the powder and metallic compound and more usually from about 90% to about 99.5% and preferably about 95% to about 99% by weight.

It is essential in accordance with the present invention that the additive materials employed in order to facilitate the sintering readily wet the nitride, that is, exhibit a low contact angle (about 40° to about 0°) with the nitride powder to be sintered. A discussion of various nickel alloys and their ability to wet aluminum nitride can be found, for instance, in Trontelj, et al., "Wetting of Aluminum Nitride by Nickel Alloys", Journal of the American Ceramic Society, Volume 61, No. 5-6, pages 204-207, May-June 1978. The work of Trontelj, et al. indicates that the melt of nickel alloys containing Group IV transition metal elements such as Hf, Zr, and Ti wets the aluminum nitride surfaces at temperatures of 1500° C. The wetting angle decreases sharply to 30° or below within 6 minutes at 1500° C.

Metallic materials suitable for sintering aids according to the present invention include alloys of nickel and/or cobalt, with rare earth elements such as yttrium lanthanum, scandium, and cerium, and alloys of nickel and/or cobalt with transition elements such as hafnium, zirconium, and titanium. Usually, the alloys contain about 90% to 30% by weight of nickel and/or cobalt and about 10% to about 70% by weight of the alloying metal.

It is necessary, in accordance with the present invention, that the metallic material be employed in the form of a sol which assures uniform distribution of the metallic materials in the microstructure of the powder. This, in turn, assures for increased sintering rate while, at the same time, making it possible to lower the temperature of the subsequent sintering. Moreover, the sintered ceramic will exhibit enhanced density characteristics and uniform microstructures.

The preparation of sol-gels of metallic compounds is well known and detailed fabrication methods can be readily determined by persons skilled in the art once aware of the present disclosure.

For instance, for a discussion of various sol-gels see Mukherjee, et al., "Microstructures and Crystalline Behavior of Gels in the System $La_2O_3-SiO_2$", Journal of the American Ceramic Society, Volume 62, No. 1-2, January-February 1979; Mukherjee, et al., "Gel Derived Single Layer Antireflection Films", Journal of Non-Crystalline Solids, 48 (1982), pages 177-184, North-Holland Publishing Co.; Brinker, et al., "Conversion of Monolithic Gels to Glasses in a Multicomponent Silicate Glass System", Journal of Materials Science, 16 (1981), pages 1980-1988; Mukherjee, et al., "Sol-gel Processes in Glass Science and Technology", Journal of Non-Crystalline Solids, Vol. 42, No. 1-3, October 1980, pages 477-488, North-Holland Publishing Company. Also, sols and/or sol-gels are discussed in U.S. Pat. Nos. 4,397,666 to Mishima, et al.; 4,429,051 to Davidge, et al.; 4,517,037 to Francis, et al.; and 4,574,063 to Scherer.

A sol is generally a multicomponent colloidal system that is semi-solid and includes a predominant amount of liquid. The gelling component is normally present in amounts less than about 10% by weight. In accordance with the present invention, initially, a sol or partially polymerized solution of the metal-organic precursors of sintering aids are formed and subsequently transformed in to a "gel" by controlling the gel processing parameters such as pH, concentration, and catalysts. In the present work, the precursors used were metal alkoxides, metal acetylacetonate metal nitrates, and acetates. For instance, in the case of an alloy of nickel and yttrium, the gel can contain $NiO-Y_2O_3$. The sols are generally in non-aqueous solvents such as alcohols including ethanol and isopropyl alcohol and aromatic hydrocarbons such as benzene and toluene, cyclohexane, methylisobutyl ketone. A mixture of polar and non-polar solvents is used to dissolve the precursors of different chemical nature.

The compounds employed provide highly reactive oxide materials that are uniformly distributed with the nitride powder.

A typical example of the preparation procedure for the gel in the $NiO-Y_2O_3$ system is given below. Gels in the other systems were prepared in a similar manner.

The selection of the precursor compounds used for the sol-gel preparation are made on the basis of the following factors:
(a) Solubility in a non-aqueous solvent.
(b) Ability to undergo either hydrolytic polycondensation or colloid sol formation.
(c) Ability of transforming either the polymeric solution or colloid sol to gel by controlling the following factors: pH, concentration of water concentration of solid.

$NiO-Y_2O_3$ gel:

The precursor for the NiO gel is nickel nitrate dissolved in ethanol or isopropanol. The precursor for $Y_2O_3$ is either yttrium nitrate or yttrium isopropoxide. Yttrium nitrate solution is prepared by dissolving $Y_2O_3$ in nitric acid solution. The solution is then evaporated to dryness to prepare yttrium nitrate which is then dissolved in ethanol or isopropanol at a pH of about 3. Alternatively, yttrium sol is prepared by dissolving yttrium isopropoxide in isopropanol.

The solutions of nickel nitrate and yttrium nitrate or yttrium isopropoxide are mixed together at a pH of about 3. This stock sol is used to either prepare the gel coating on the AlN powders or to make a composite powder containing AlN and gel.

The following techniques are used to prepare the composite powders:
(a) The nitride powders are added to the sol at a high viscosity of about 250 centipoise and above, and are allowed to gel either by increasing pH to about 7 or 8 or by evaporating the solution.
(b) Multiple percolation of the sol through a thin layer of the nitride powder until all the sol is absorbed to the nitride powder surfaces.

Similar approaches are used to prepare the sols of the other oxide systems. The sources for other oxides are as follows:

| Oxide | Precursors |
|---|---|
| $ZrO_2$ | Zirconium Butoxide in Butanol |
| $TiO_2$ | Titanium isopropoxide, titanium butoxide |
| CoO | Cobalt Nitrate |

According to the procedure whereby nitride particles are coated with the gel, the organics employed in the gel are mostly removed by thermal treatment of 150° C. up to about 350° C., thereby resulting in a porous reactive surface oxide layer. However, some residual organics remain which provide a reducing atmosphere during subsequent fixing stages at higher temperatures in nitrogen atmosphere. The powders thus obtained after calcining at 350° C. to about 600° C. are subjected to sintering process.

The powder compacts obtained with the gel-coated samples are subjected to sintering at a temperature of about 1500° C. to about 1900° C. and preferably about 1600° C. to 1800° C., typical of which is about 1700° C.

Two different sintering techniques are used for the fabrication of sintered bodies: (a) hot pressing and (b) pressureless sintering.

The following non-limiting examples are presented to further illustrate the present invention:

EXAMPLE 1

Sintering Under Pressure:

The gel-coated powders are heated up to about 600° C. in $N_2$ atmosphere and are subsequently placed into a cylindrical graphite die of 0.5" inner diameter. The pistons, also of graphite, were lined with a graphite foil to facilitate the removal of the hot-pressed specimen from the die. The powder is cold compacted at about 5 MPa and then placed in a tungsten mesh furnace. The hot pressing experiments are carried out at about 1600° C. and about 1700° C. in a nitrogen atmosphere. The heat-up time for the furnace is approximately 1 hour. During this period, a load of about 1-2 MPa is maintained on the powder.

After the furnace comes up to temperature, the piston is moved at a constant displacement rate by means of a screw-driven machine. The cross-head movement then can be directly translated to the density of the specimen using the expression:

$$\rho/\rho_{th} = L_{th}/L \qquad (1)$$

Here, $\rho_{th}$ is the theoretical density of aluminum nitride (3.26 gm/cm3), and L is the length of the specimen when its density is $\rho$. The quantity $L_{th}$ is related to the theoretical density by the equation:

$$L_{th} = 4W/\pi D^2 \rho_{th} \qquad (2)$$

where W is the weight of the specimen and D is diameter of the graphite die.

As stated above, the hot-pressing tests were carried out at constant cross-head velocity. The magnitude of the strain rate, therefore, changed (increased) with densification. The initial strain-rate, however, can be specified using the following equation:

$$E_o = L/L_o$$

where L is the crosshead displacement rate and $L_o$ is the initial length of the powder compact.

Figure 2:
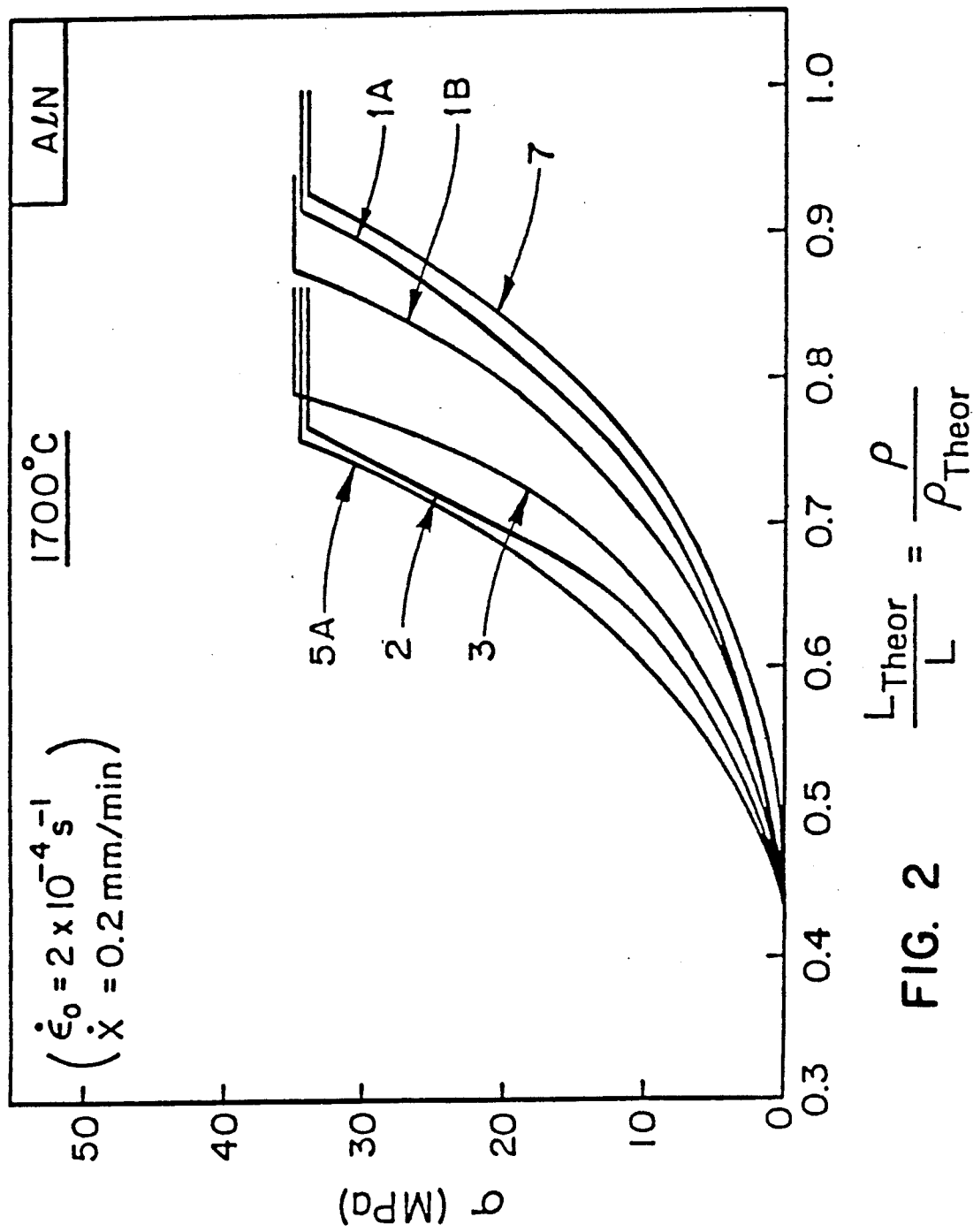
FIG. 2 is a graph that demonstrates densification properties obtained employing various sol-gel compositions.

During the experiment the axial stress applied to the specimen is measured continuously. It is equal to the load experienced by the piston divided by the area of cross section of the piston. The load is measured by means of a load cell A. Typical curve for the change in the stress at about 1700° C. with compression of the powder compact of certain compositions is shown in FIG. 2. The compositions of these examples are given in Table 1.

The silica+nickel composition is the worst performer while yttria+nickel is the best. Doubling the weight fraction of yttria improves densification only marginally (compare 1A to #7). The addition of nickel to yttria produces a definite improvement (1A versus 1B).

TABLE 1

| Sample Number | Additives | Density gm/cm³ |
|---|---|---|
| 1A | 9 wt % yttria + 1 wt % Ni | 3.24 |
| 1B | 10 wt % yttria | 3.20 |
| 2 | 1 wt % Ni | 3.07 |
| 3 | 2 wt % Ni | 3.17 |
| 5A | 4 wt % silica + 1 wt % Ni | 3.14 |
| 7 | 19 wt % yttria + 1 wt % Ni | 3.24 |

On the other hand, curve noted as "1B" contains only yttrium and those identified as 2 and 3 contain only nickel. As can be appreciated, such exhibit significantly inferior properties to those containing both yttrium and nickel in the gel-sol.

Figure 3:
FIG. 3. Transmission Electron Micrograph of sintered specimen of composition 1A of the present invention.

A typical TEM micrograph of fine grain sintered sample (1A) is shown in FIG. 3.

EXAMPLE 2

A typical example of the pressureless sintering, i.e., when no external pressure is applied to the powder compact, is described below:

A powder compact without any binder is made by cold compaction at about 2000 psi for about 1 minute. The pellet is heated in a furnace which is evacuated to 100 microns or less and then back-filled with nitrogen three times prior to heating cycle. The pellet is heated to about 1880° C. at a heating rate of about 580° C. per hour and is sintered at about 1880° C. for about 2 hours (completely dense bodies were obtained).

The pressureless sintering is usually completed in about ½ hour to 2 hours and preferably 1 to about 2 hours. The temperature is in the range of about 1700° C. to about 1900° C.

The final sintering is carried out under $N_2$ atmosphere. An initial thermal treatment with $NH_3$ gas up to a temperature of about 1500° C. is employed. The function of the $NH_3$ gas is to reduce the gel-layer to form metallic and/or nitrides which helps in wetting of the grain boundary.

The gel layer which is chemically an oxide containing residual organics subsequently changes chemically and physically during subsequent steps used for sintering.

It is critical to the present invention that a gel of a metallic material be employed that forms a low contact angle with the powder. This, as discussed above, can be achieved by using a combination of nickel and/or cobalt with rare earth oxides and/or Group IV transition metal oxides as sintering aid. Although rare earth oxides and Group IV transition metal oxides individually have been suggested, such do not form the low contact angle as required by the present invention.

Having thus described our invention, what we claim as new and desire to secure by letters patent is:

1. A method for producing an aluminum nitride ceramic which comprises:
   (a) obtaining a powder of aluminum nitride;
   (b) contacting said powder with gel of a metallic compound that forms a low contact angle with said powder at the sintering step (d) and wherein said metallic compound include a member selected from the group of cobalt, nickel and mixtures thereof and at least one alloying member selected from the group of transition elements and rare earth elements;
   removing solvents and any organic material obtained from the composition from step (b);
   (d) sintering the composition from step (c) to thereby produce said ceramics.

2. The method of claim 1 wherein said powder has a particle size of about 1 $\mu$ to about 12 $\mu$.

3. The method of claim 1 wherein the average particle size of said powder is about 2 microns.

4. The method of claim 1 wherein the metallic compound produced from the gel layer forms a contact angle of about 0° to about 40° with said powder at the sintering step.

5. The method of claim 1 wherein said gel is applied as a coating to said powder or was intimately mixed as a second phase in the composite powder.

6. The method of claim 1 wherein said powder is dispersed in a non-aqueous medium containing organo-metallic compound capable of forming a gel and then converting the dispersion into a gel.

7. The method of claim 1 wherein said powder comprises at least about 90% by weight of the combined solids from said powder and metallic compound.

8. The method of claim 1 wherein said powder comprises about 90% to about 99.5% by weight of the combined solids from said powder and metallic compound.

9. The method of claim 1 wherein said metallic compound is an alloy of nickel and an alloying metal selected from the group of yttrium, lanthanum, Sc, Ce, hafnium, zirconium, titanium.

10. The method of claim 9 wherein said alloy contains about 90% to about 30% of nickel and about 10% to about 70% by weight of said alloying metal.

11. The method of claim 9 wherein said metallic compound is an alloy of nickel and yttrium.

12. The method of claim 1 wherein said sintering is carried out at temperatures of about 1500° C. to about 1900° C.

13. The method of claim 1 wherein said sintering is carried out under a reducing atmosphere.

14. The method of claim 1 wherein said sintering is carried out in the presence of ammonia.

15. The method of claim 1 wherein said sintering is a pressureless sintering.

16. The method of claim 1 wherein said sintering is completed in about ½ hour to about 2 hours.

17. The method of claim 1 wherein said sintering is hot pressing.

* * * * *